(12) United States Patent
Putrams (10) Patent No.: US 12,546,291 B2
(45) Date of Patent: Feb. 10, 2026

(54) WIND-TURBINE MAINTENANCE DEVICE

(71) Applicant: AERONES, Inc, San Jose, CA (US)

(72) Inventor: Janis Putrams, Riga (LV)

(73) Assignee: AERONES AMERICA LLC, San Jose, CA (US)

( * ) Notice: Subject to any disclaimer, the term of this patent is extended or adjusted under 35 U.S.C. 154(b) by 0 days.

(21) Appl. No.: 18/715,971

(22) PCT Filed: Dec. 1, 2022

(86) PCT No.: PCT/IB2022/061627
§ 371 (c)(1),
(2) Date: Jun. 3, 2024

(87) PCT Pub. No.: WO2023/100122
PCT Pub. Date: Jun. 8, 2023

(65) Prior Publication Data
US 2025/0035088 A1    Jan. 30, 2025

Related U.S. Application Data

(60) Provisional application No. 63/284,681, filed on Dec. 1, 2021.

(51) Int. Cl.
*F03D 80/50*    (2016.01)
*F03D 13/10*    (2016.01)

(52) U.S. Cl.
CPC .............. *F03D 80/50* (2016.05); *F03D 13/10* (2016.05); *F05B 2230/61* (2013.01)

(58) Field of Classification Search
CPC .......... F03D 80/50; F03D 80/55; F03D 13/10; F05B 2230/61; F05B 2230/80; F05B 2240/912; F05B 2240/916
See application file for complete search history.

(56) References Cited

U.S. PATENT DOCUMENTS

2012/0003089 A1    1/2012    Byreddy
2015/0090504 A1    4/2015    Bagheri

FOREIGN PATENT DOCUMENTS

| CN | 105836594 A | 8/2016 |
|---|---|---|
| KR | 20130143425 A | 12/2013 |
| WO | 2015140357 A1 | 9/2015 |

OTHER PUBLICATIONS

International Search Report for PCT PCT/IB2022/061627, Prepared by the European Patent Office, Mailing date Feb. 3, 2023, 4 pages.

*Primary Examiner* — Moshe Wilensky
(74) *Attorney, Agent, or Firm* — Brooks Kushman P.C.

(57) ABSTRACT

A semi- or fully automated maintenance device for use with a wind turbine is described. The maintenance device includes a base that is removably coupled to a tower of the wind turbine. This base may be vertically displaced along a vertical direction of the tower. Moreover, the maintenance device may include a telescopic arm in a horizontal direction relative to the vertical direction. This telescopic arm may provide a selectable and dynamic displacement of a distal end of the telescopic arm relative to a vertical axis of the tower. Furthermore, the maintenance device may include a maintenance arm coupled to the distal end of the telescopic arm. During operation, while the maintenance device is moved in the vertical direction and the telescopic arm dynamically adjusts the horizontal displacement, the maintenance arm may perform maintenance, such as inspection, cleaning, repair, of a given wing or blade of the wind turbine.

20 Claims, 10 Drawing Sheets

WIND-TURBINE MAINTENANCE DEVICE

CROSS-REFERENCE TO RELATED APPLICATION

This application is the U.S. national phase of PCT Application No. PCT/IB2022/061627 filed on Dec. 1, 2022, which claims the benefit to U.S. Provisional Application No. 63/284,681 filed on Dec. 1, 2021, the disclosures of which are incorporated in their entirety by reference herein.

TECHNICAL FIELD

The described embodiments relate to techniques for performing maintenance on a wind turbine. Notably, the described embodiments relate to a maintenance device for semi- or fully-automated maintenance of a blade of a wind turbine.

BACKGROUND ART

Offshore wind energy is harnessed at sea where the wind is typically more constant and the wind speed is, on average, higher. While offshore wind farms may be capable of generating more usable electricity, the installation and maintenance of offshore wind turbines are often significantly more complicated than for onshore wind farms.

Offshore wind turbines and substructures can weigh 1000 tons or more. There is a high demand for adequate substructures, especially as wind turbine size and the water depth where wind turbines are located increase. Offshore wind turbines are typically secured using one of two types of anchorage systems or turbine substructures: fixed foundations, or floating platforms.

Notably, in the course of use, wind turbines are subject to damage (such as leading-edge erosion or crack formation) because of factors such as: lightning, a harsh environment (e.g., temperature cycling, salt exposure, ice formation, etc.), infestation (e.g., insects), dust, algae, etc. Consequently, wind turbines require regular maintenance.

For land-based wind turbines, maintenance is sometimes performed manually. Notably, maintenance workers may access the blades in a wind turbine via ropes. However, this maintenance technique is expensive, time-consuming, seasonal and potentially dangerous.

Consequently, for land-based wind turbines, maintenance equipment is sometimes deployed from the ground to perform semi-automated maintenance. For example, maintenance equipment may be positioned over a wind-turbine blade from the ground using a winch and pulley system. Moreover, in order to properly stabilize the maintenance equipment, the maintenance equipment is usually secured by up to four anchor points on the ground around a base of a wind-turbine tower.

However, these maintenance techniques are much more complicated with an offshore wind turbine. For example, manual maintenance is either not allowed or requires support personnel to standby in proximity to ensure the safety of maintenance workers. Alternatively, semi-automated maintenance is more difficult, because it is not possible to anchor maintenance equipment to multiple locations around a base or a wind-turbine tower. In the absence of such anchoring, it is often difficult to address lateral motion of the maintenance equipment when there is a strong or variable crosswind.

SUMMARY OF THE INVENTION

The goal of the invention is to overcome the drawbacks of the prior art solutions and provide an effective device, which could be used for maintenance, including inspection, cleaning, or repair of a wind turbine blades.

The set goal is reached by the wind turbine blade maintenance device, suitable for inspection, cleaning, or repair of the wind turbine blades, the device comprising: a base configured to be removably attached to a tower of a wind turbine and configured to displace in a vertical direction along a length of the tower; a telescopic arm, mechanically coupled to the base, disposed approximately in a horizontal direction relative to the vertical direction, wherein the telescopic arm is configured to provide a selectable and dynamic displacement of a distal end of the telescopic arm relative to a vertical axis of the tower; and a maintenance arm, mechanically coupled to or proximate to the distal end of the telescopic arm, wherein the maintenance arm comprises one or more sensors, one or more maintenance devices or both that are configured to perform maintenance on a given blade of the wind turbine.

The base may comprise wheels and one or more magnets that are configured to provide an attractive force with the tower. The base may further comprise an electric motor configured to displace the maintenance device in the vertical direction.

According to an embodiment, the maintenance device may be configured to attach to a cable anchor to or proximate to a top of the tower; and may further comprise a winch configured to displace the maintenance device in the vertical direction. The cable may be included in a truss.

According to yet another embodiment, the maintenance device may be configured to be attached to a lift device that is configured to displace the maintenance device in the vertical direction.

According to the preferred embodiment, the telescopic arm is configured to collapse along the horizontal direction and rotate towards the vertical direction and away from the horizontal direction, when the maintenance device is not in use. The telescopic arm may be configured to be selectively disposed approximately in the horizontal direction relative to the vertical direction.

During the maintenance, the maintenance device is configured to: displace in the vertical direction; dynamically adjust the horizontal displacement; and perform the maintenance on the given blade. According to an embodiment, the maintenance device is configured to be fully automated. According to yet another embodiment, the maintenance device may be configured to be controlled from a remote location at a different geographic location than the wind turbine.

According to yet another embodiment, the telescopic arm of the maintenance device is further configured to provide a dynamic force in a lateral direction, which is perpendicular to a plane defined by the vertical direction and the horizontal direction, and wherein the dynamic force is based at least in part on or corresponds to one or more of: wave-induced motion, a wind speed, or a wind direction. Thus, the telescopic arm may comprise one or more electric turbines configured to provide a force in a lateral direction, which is perpendicular to a plane defined by the vertical direction and the horizontal direction. The maintenance device may be also configured to provide a feedback loop that dynamically adjusts the lateral force provided by the one or more electric turbines based at least in part on a measurement, wherein the measurement comprises: displacement of the telescopic arm in the lateral direction; wave-induced motion; a wind speed;

or a wind direction. Adjusting the force may comprise changing a magnitude of the force or a direction of the force.

DETAILED DESCRIPTION OF THE INVENTION

An unmanned maintenance device for use with a wind turbine (such as an offshore wind turbine) is described. This maintenance device may include a base or a mechanical crawler that is removably coupled or attached to a tower of the wind turbine. For example, the base may include magnetic wheels (and/or one or more permanent magnets and/or one or more electromagnets that are separate from the wheels) that have an attractive force with the tower and that allow the base to be displaced along a vertical direction of the tower. In some embodiments, the maintenance device may be vertically displaced along the vertical direction (e.g., up the full length of the tower, such as 25 m or more) using a motor or winch and one or more cables and/or pulleys (such as a truss) that are coupled to a top (or proximate to the top) of the tower. For example, a cable may be attached to (e.g., by a separate crawler or drone) and/or lowered to the maintenance device from or proximate to the top of the tower, and the maintenance device may be removably coupled to an end of the cable. Note that when being lowered, motion of the cable away from the tower may be constrained, e.g., by using an anchor device at or proximate to the end of the cable and that has magnetic wheels (and/or one or more permanent magnets and/or one or more electromagnets that are separate from the wheels) that have an attractive force with the tower and that allow the anchor device, and thus the end of the cable, to be displaced along the vertical direction of the tower. Alternatively, or additionally, the base may be vertically displaced along the vertical direction using an optional lift device, which may be removably anchored to a base of the tower or proximate to the base of the tower (e.g., on a separate floating platform or boat that is adjacent to the tower) and that selectively pushes the maintenance device along the vertical direction. In some embodiments, the base may include step motors that, at least in part, displace the maintenance device along the vertical direction.

Moreover, the maintenance device may include a telescopic arm that can be selectively deployed in a horizontal direction (or approximately in a horizontal direction, such as within 30° of horizontal) relative to the vertical direction. For example, when not in use, the telescopic arm may be collapsed or compressed and may be rotated along the vertical direction for compact storage in a support device (such as a storage box). Then, during use, the telescopic arm may be rotated from the vertical direction to the horizontal direction. Note that the storage device may provide power to the maintenance device, and may open or close for attachment of the maintenance device to the tower, operation of the maintenance device, etc.

The telescopic arm may provide a selectable and dynamic displacement of a distal end of the telescopic arm relative to a vertical axis of the tower (and, thus, the vertical direction). Furthermore, the maintenance device may include a maintenance arm coupled to the distal end of the telescopic arm. This maintenance arm may include one or more sensors (such as a camera, a conductivity sensor, an ultrasonic sensor, an x-ray sensor, a laser scanner, etc.) and/or the one or more maintenance devices (such as a dispenser or an adhesive or polymer to fill identified cracks or holes). During operation, while the maintenance device is moved in the vertical direction and the telescopic arm dynamically adjusts the horizontal displacement, the maintenance arm may perform maintenance (such as inspection, cleaning, preventive maintenance, repair of a broken component, drainage hole cleaning, ice-phobic coating painting, painting, non-destructive testing, a lightning-protection-system check, etc.) of a given wing or blade of the wind turbine, e.g., using the one or more sensors and/or the one or more maintenance devices. Note that operation of the maintenance device may be semi- or fully automated. In some embodiments, the maintenance device is controlled (e.g., by a computer system and/or a human operator) from a remote location at a different geographic location that the wind turbine, e.g., the maintenance device may receive instructions and/or may provide measurements (such as an image of the given blade) using wireless communication (such as using a cellular or a satellite communication protocol).

After maintenance on the given blade is completed, at least some of the aforementioned operations (such as vertically displacing the maintenance device, deploying the telescopic arm in the horizontal direction, varying the horizontal displacement and/or performing the maintenance) may be performed on one or more additional blades in the wind turbine. Once the maintenance work on the wind turbine is completed, the maintenance device (and the optional lift device) may be decoupled from the tower, and stored in the support device (e.g., at or proximate to the base of the tower or the top of the tower) or may be relocated to another wind turbine, where maintenance can be performed. Note that when stored in the support device, the maintenance device may remain in a standby or ready state.

Thus, the maintenance device may remain with the wind turbine or may be episodically delivered for use with the wind turbine. For example, the maintenance device may be delivered to and removed from the wind turbine using a delivery system, such as a boat. Alternatively, the maintenance device may be semi- or permanently installed on or proximate to the wind turbine, which may allow the maintenance to be performed with reduced cost and at a preferred time, such as when the wind speed is low or reduced and the wind turbine is unused or an opportunity cost of taking the wind turbine offline for maintenance is reduced or minimal. Consequently, in some embodiments, the maintenance device may be permanently attached to the tower. More generally, the disclosed maintenance techniques may reduce: time, cost and risk associated with maintenance on wind turbines.

In some embodiments, the maintenance device may perform maintenance on the given blade when the given blade is in a downwind or leeward position behind the tower. Nonetheless, the maintenance device may be subject to lateral displacement along a lateral direction (e.g., out of a plane defined by the vertical direction and the horizontal direction) because of dynamic or steady-state crosswind. In order to compensate or correct for the lateral force associated with the crosswind and/or wave-induced motion, the telescopic arm may include one or more electric turbines that provide a counterforce in the lateral direction. The one or more electronic turbines may be included in a feedback loop that adjusts the magnitude and/or the direction of the (counter-) lateral force based at least in part on measured lateral displacement of the telescopic arm (relative to a target position specified by a local positioning system or the Global Positioning System) and/or measured wind speed and/or direction.

The maintenance device may be partially or fully automated and may support a variety of maintenance techniques. For example, the delivery system may use a boat or a concrete post for mounting the support device on or proximate to the wind turbine. In embodiments that use a boat, while the delivery system may be mostly automated, there may be some human interaction (e.g., maneuvering or piloting the boat). Note that a wide variety of delivery systems can bring the support device to the wind turbine. Moreover, a wide variety of maintenance devices may be used with the maintenance device. Furthermore, the maintenance device may be untethered or tethered to the tower during the maintenance.

Figure 1:
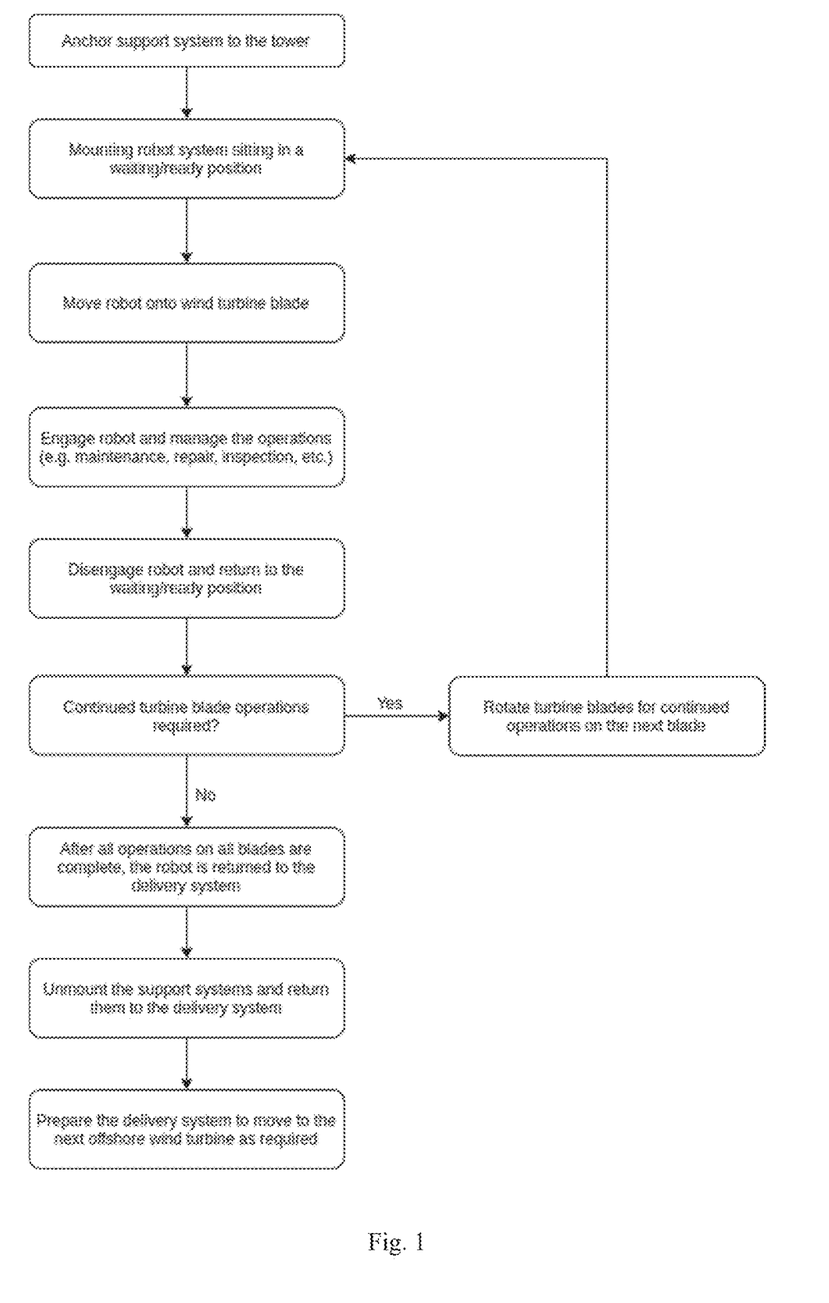
FIG. 1 presents an example of a high-level overview of operations performed by the delivery system and the maintenance device.

FIG. 1 presents an example of a high-level overview of operations performed by the delivery system and the maintenance device. Notably, FIG. 1 illustrates the operations for how a maintenance device is mounted or delivered to a wind turbine for use. Whether unmanned, or manned, the delivery system may take the support device and the maintenance device to a location or site of the wind turbine and the support device may then be anchored to the tower. The maintenance device may sit in the support device in a waiting/ready position. As described further below, this position can be at one of several possible locations on or proximate to the tower. Then, the maintenance device may be moved onto a turbine blade, where it may be engaged and the operations of the maintenance device may be managed.

Next, the maintenance device may be disengaged and returned to its waiting/ready position. Regardless of where the maintenance device is located during the waiting/ready position, if maintenance is to be performed on a second blade, the maintenance device may repeat at least some of the preceding operations. After some or all of the turbine blades have been tended to, the maintenance device may return to the support device and/or the delivery system and wait there, ready for use on the same or another offshore wind turbine.

The delivery of the maintenance device can be fully automated or partially automated. Several techniques for how the support device (which may store the maintenance device when it is not in use) and maintenance device are mounted onto a wind turbine can be used.

Figure 2:
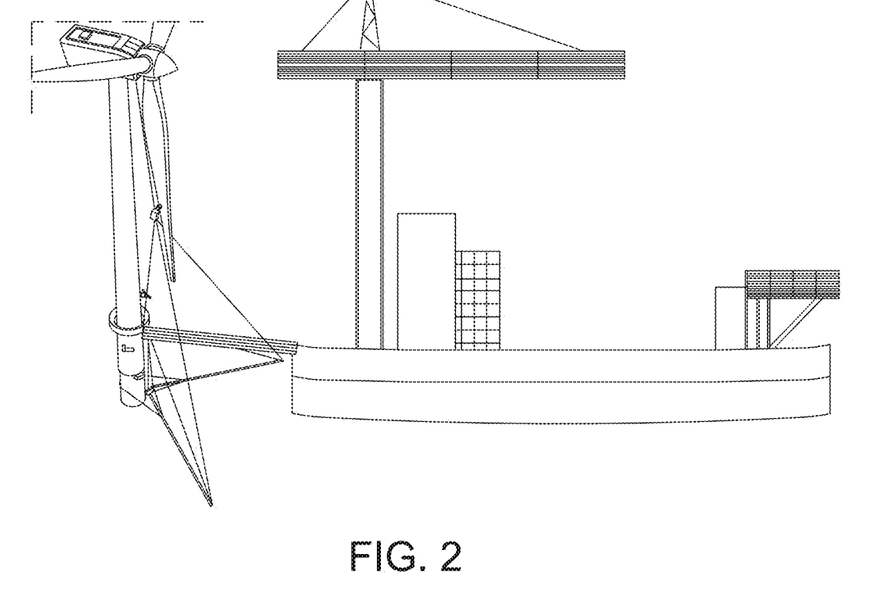
FIG. 2—shows an example of a boat-based delivery system.

FIG. 2 illustrates an example of a boat-based delivery system. The maintenance device in its ready state may be located at or proximate to the base of the tower. Moreover, a cable system may be used to move the maintenance device along the vertical direction. Once the maintenance device has completed the maintenance on the wind-turbine blade, the maintenance device may descend along the vertical direction and onto the boat. The next blade may rotate into a down-facing position and the maintenance device may reattach or recouple to the tower. In these embodiments, one or more cables may need to be moved or manipulated out of the way and may need to be secure (e.g., to the tower) to allow the blades to rotate. Note that FIG. 2 illustrates an embodiment that may be used with multiple anchor points, which may be present in a floating substructure.

Figure 3:
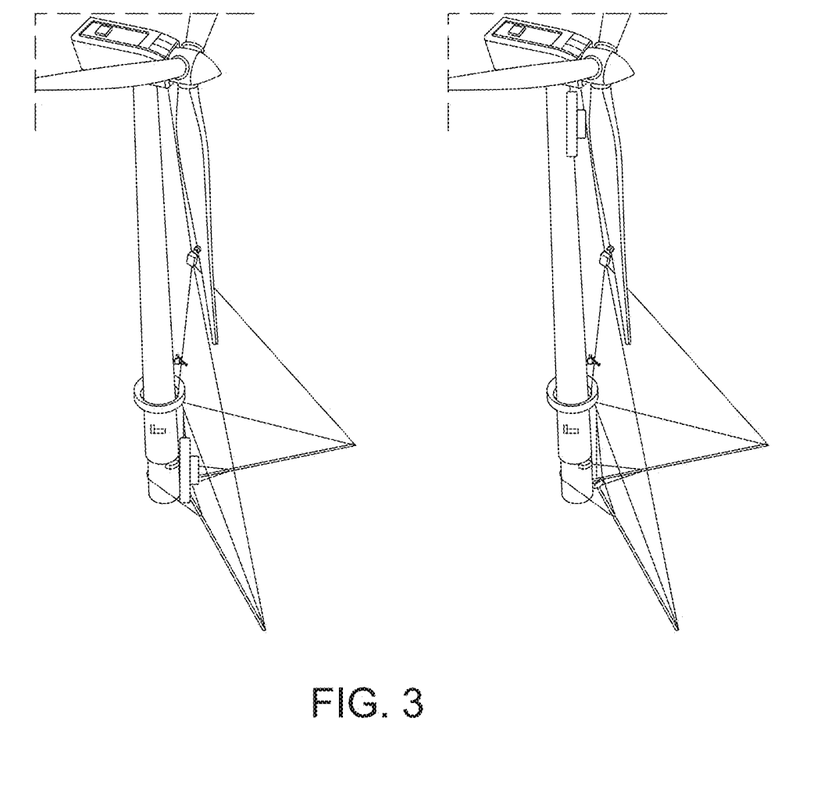
FIG. 3—an example of tower-based deployment of the claimed device.

FIG. 3 illustrates an example of tower-based deployment. Notably, in some embodiments, the maintenance device may wait at the base or top of the tower, e.g., in the support device. For example, when the maintenance device waits at the base of the tower, it may climb or be pushed and/or pulled up the tower. Once at the top, it may crawl across the nacelle (or exterior and top-most portion of the wind turbine) to the blade requiring maintenance. The device may complete the maintenance tasks, and may return to the tower where it will descend to its ready state/location. Alternatively, as described previously, the maintenance device may remain removably attached to the tower and may vary the vertical and/or horizontal displacement of the maintenance arm (e.g., by moving the base and/or changing the telescopic arm) while performing the maintenance. Note that FIG. 3 illustrates an embodiment that may be used with multiple anchor points, which may be present in a floating substructure.

Figure 4:
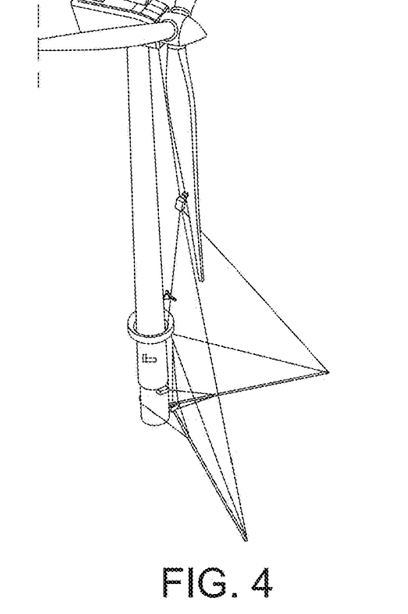
FIG. 4—an example of nacelle-based deployment of the claimed device.

FIG. 4 illustrates an example of nacelle-based deployment. Notably, in some embodiments, the maintenance device may wait at the nacelle. From here, the maintenance device may climb along the nacelle and to the rotor. At the rotor, the maintenance device can crawl to the appropriate turbine blade to complete the maintenance tasks, and may return to the rotor to climb the next blade, or return to the top of the nacelle. Note that FIG. 4 illustrates an embodiment that may be used with multiple anchor points, which may be present in a floating substructure.

Figure 5:
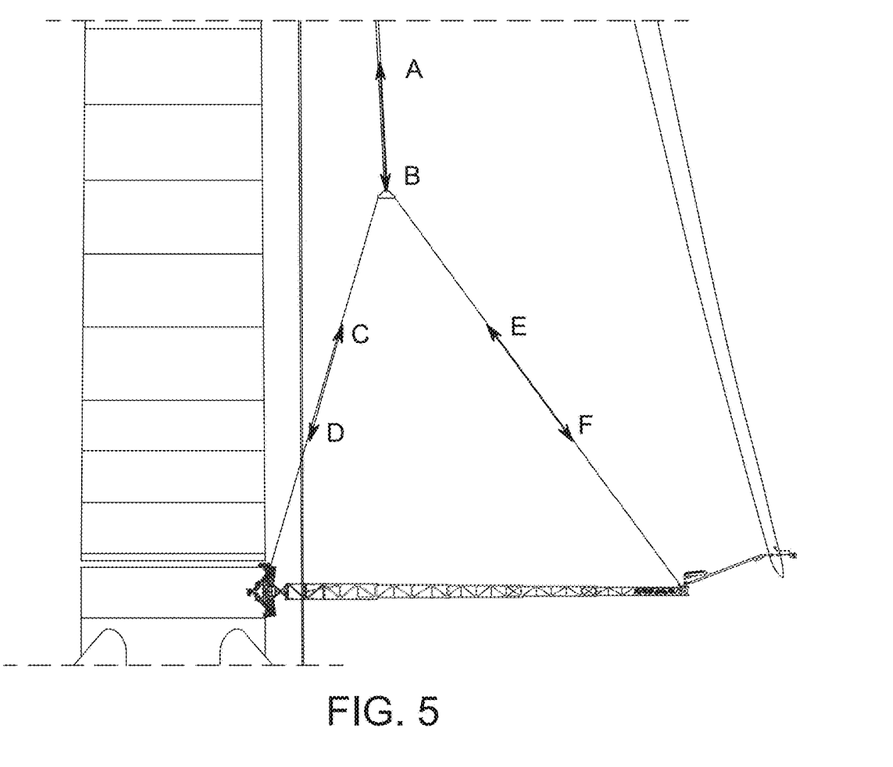
FIG. 5—an example of platform-based winch system.

As discussed previously, the maintenance device may use a truss and a winch to move the maintenance device along the vertical direction and may use the telescopic arm to dynamically adjust the horizontal displacement. FIG. 5 illustrates an example of the motions of the maintenance device.

As shown in FIG. 5, movement of the maintenance device upwards (A) and downwards (B) may occur using a platform-based winch. For adjusting angles in relation to the horizontal direction, off-the-shelf or custom-made winches can be used. The forces applied by the winches are represented as C, D, E, and F in FIG. 5.

Figure 6:
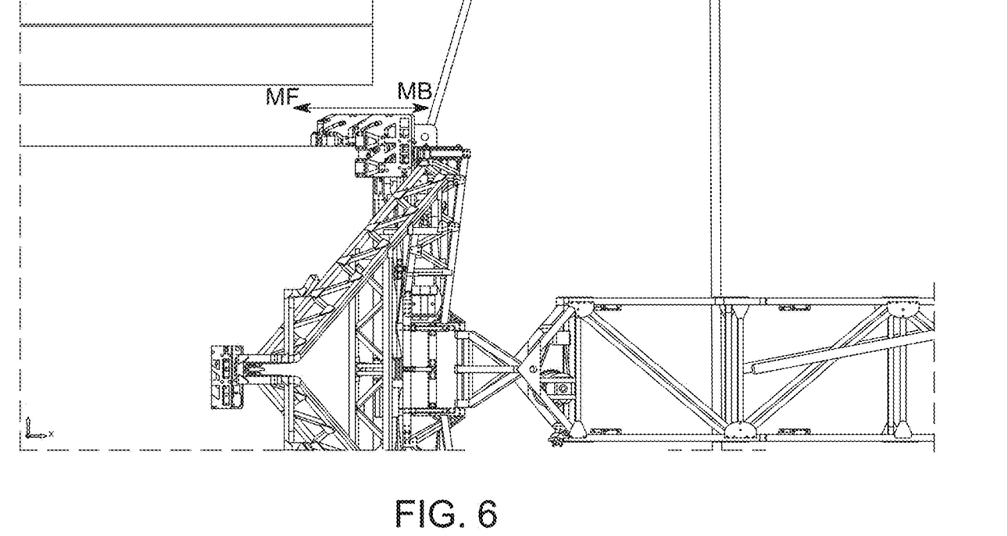
FIG. 6—an example of the base and the telescopic arm in the maintenance device.

Moreover, in order to avoid the need for welds (which join two pieces of metal together), electric motors may be used and may be integrated into the base, which is sometimes referred to as a magnetic block assembly. This is shown in FIG. 6, which shows an example of the base and the telescopic arm in the maintenance device. Note that the electric motors may facilitate movement of the base and may allow the maintenance device to be attached to the tower (MF) or detached from the tower (MB).

Figure 7:
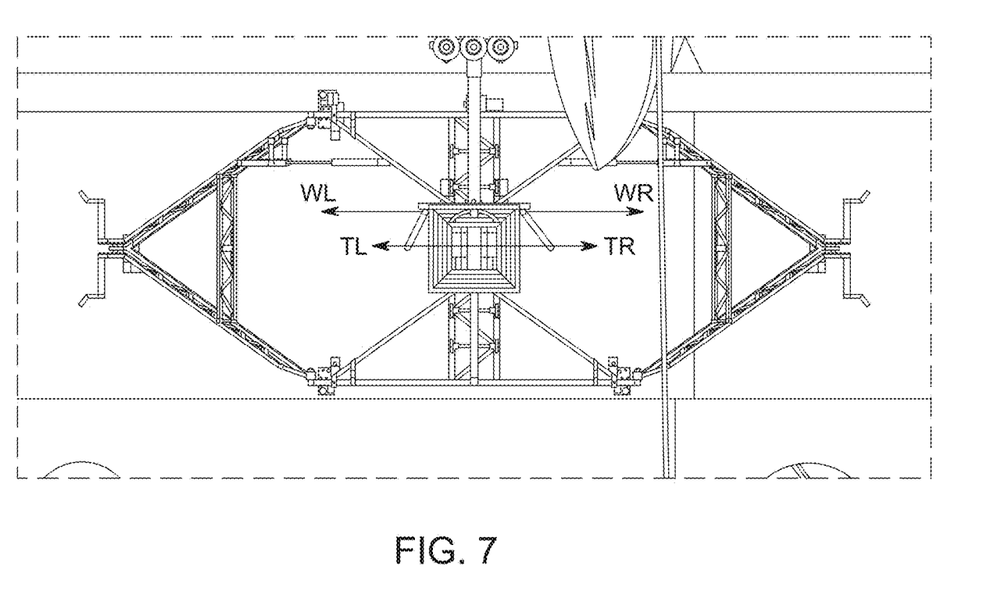
FIG. 7—an example of the directions of motion provided by side winches in the maintenance device.

FIG. 7 presents an example of the directions of motion provided by side winches in the maintenance device. Note that the side winches allow for movement in the WL and WR directions. Also note that the lateral motion of the distal end of the telescopic arm is stabilized by the blade. The distal end may be moved in the TL and TR directions.

Figure 8:
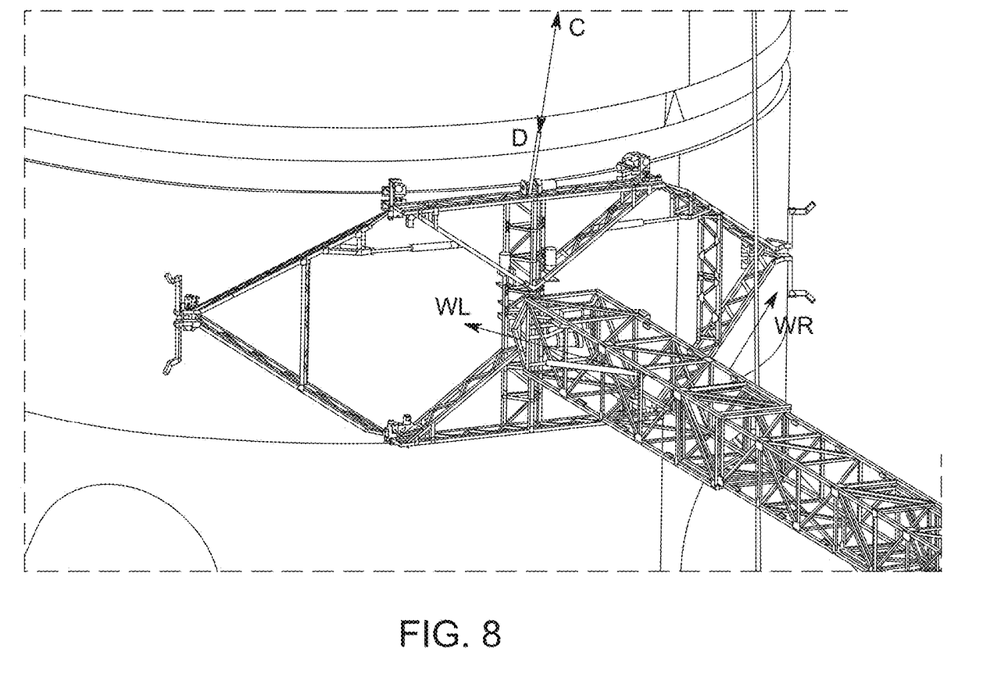
FIG. 8—illustrates the folding and unfolding movements of the telescopic arm.

FIG. 8 presents an example of the winch in FIG. 5 from a different angle and illustrates the folding and unfolding movements of the telescopic arm. Notably, FIG. 8 shows the WL and WR movements again. In addition, actuators A1 and A2 are shown. These actuators may provide the folding and unfolding movement of the magnetic block assembly. Note that the system for device steering is mounted and shown in FIG. 8 as six servo motors.

Figure 9:
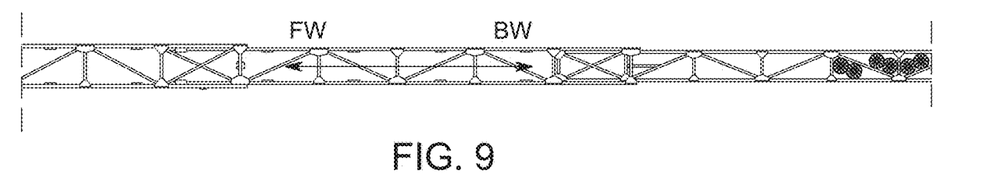
FIG. 9—shows embodiment of the telescopic arm and its movements.

FIG. 9 presents an example of the telescopic arm and its movements. Note that the telescopic arm may be extended and retracted in the FW and BW direction with the help of the winch.

Figure 10:
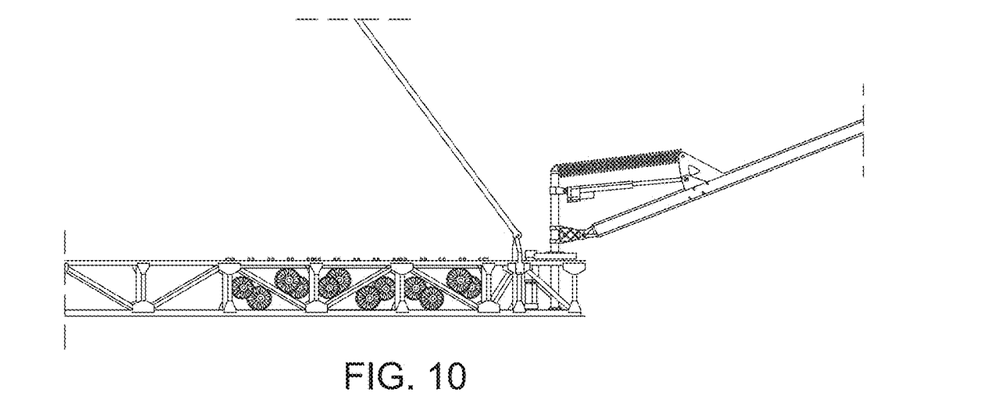
FIG. 10—shows a distal end of the telescopic arm, comprising electric turbines or motors to counter the effect of crosswind.

In some embodiments, the distal end of the telescopic arm may include one or more electric turbines or motors to counter the effect of crosswind. This is shown in FIG. 10, which illustrates an example of the telescopic arm. In some embodiments, the one or more electric turbines may include a fan and motor. Note that the one or more electric turbines may be holding the maintenance device in the plane defined by the vertical direction and the horizontal direction, so that a toolhead (with the one or more sensors and/or the one or more maintenance devices) on the maintenance arm performs the maintenance. In some embodiments, the one or more electric turbines may be battery powered. One or more batteries in the maintenance device may be charged to provide immediate and constant power to the one or more electric turbines.

Figure 11:
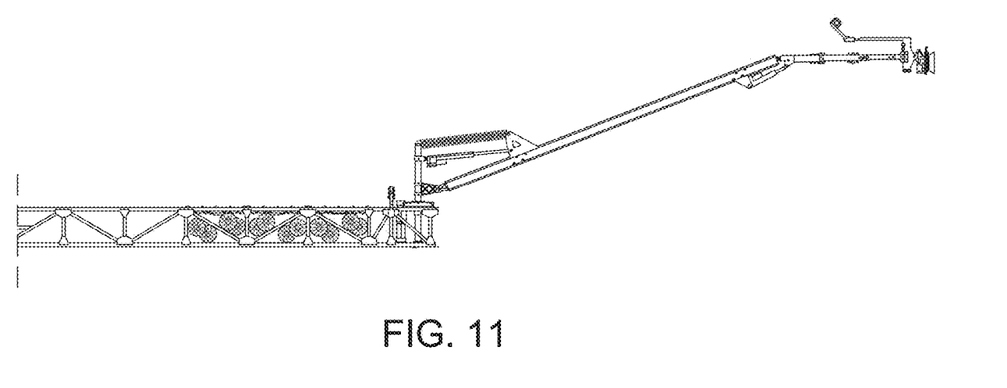
FIG. 11—shows an example of integration of a toolhead on a maintenance arm of the maintenance device.

FIG. 11 illustrates an example of integration of a toolhead on a maintenance arm of the maintenance device.

Figure 12:
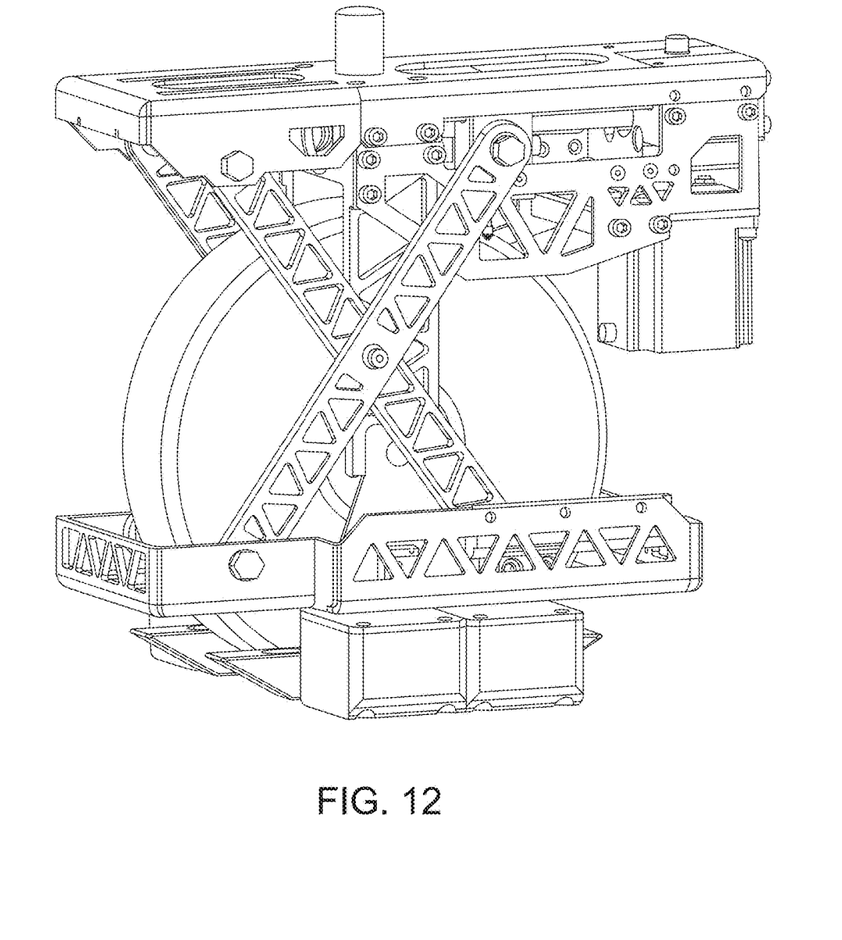
FIG. 12—an example of a magnetic block assembly.

FIG. 12 illustrates an example of a magnetic block assembly. As shown in FIG. 12, up and down movement of the base may be provided by an electric motor. This movement may also allow for removable attachment or detachment of the maintenance device to/from the tower. For improved grip and lifting power, the magnetic block assembly may include integrated wheels with a built-in motor.

Figure 13:
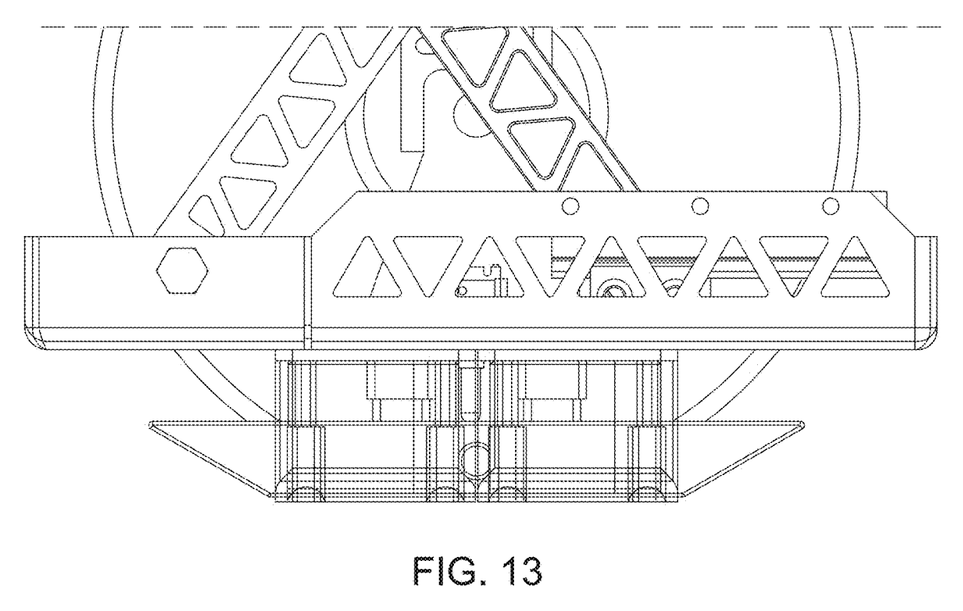
FIG. 13—an example of the magnetic block assembly with a more detailed view of the electric control.

FIG. 13 presents an example of the magnetic block assembly with a more detailed view of the electric control (such as a potentiometer and the magnet control). Notably, for electric control and magnet lifting there may be a potentiometer integrated into the magnetic block assembly. The potentiometer may be used to control the height of magnets in the up and down direction.

Figure 14:
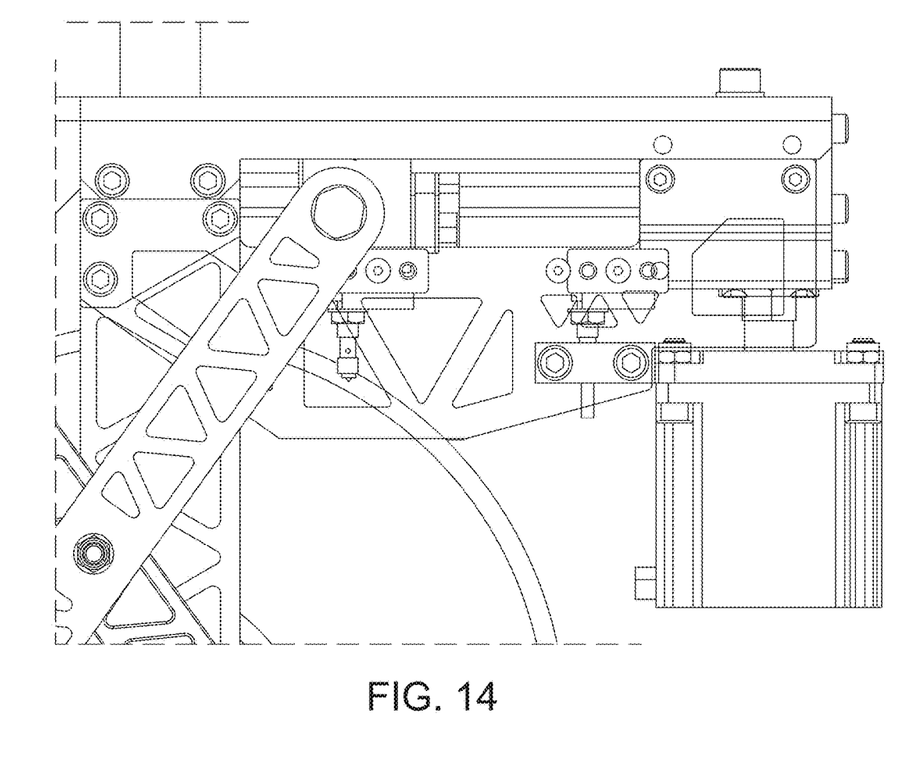
FIG. 14—an example of a proximity sensor that controls the limits of the height of the magnets that are pulled up or down.

FIG. 14 presents an example of a proximity sensor that controls the limits of the height of the magnets that are pulled up or down.

A variety of techniques may be used to removably or permanently anchor or mount the maintenance device to the wind turbine. These include: drone and anchor, magnetic crawler and anchor, magnetic with no anchor, vacuum crawler and anchor, crawler and belt, two crawlers and belt, and/or a tethered maintenance device.

Figure 15:
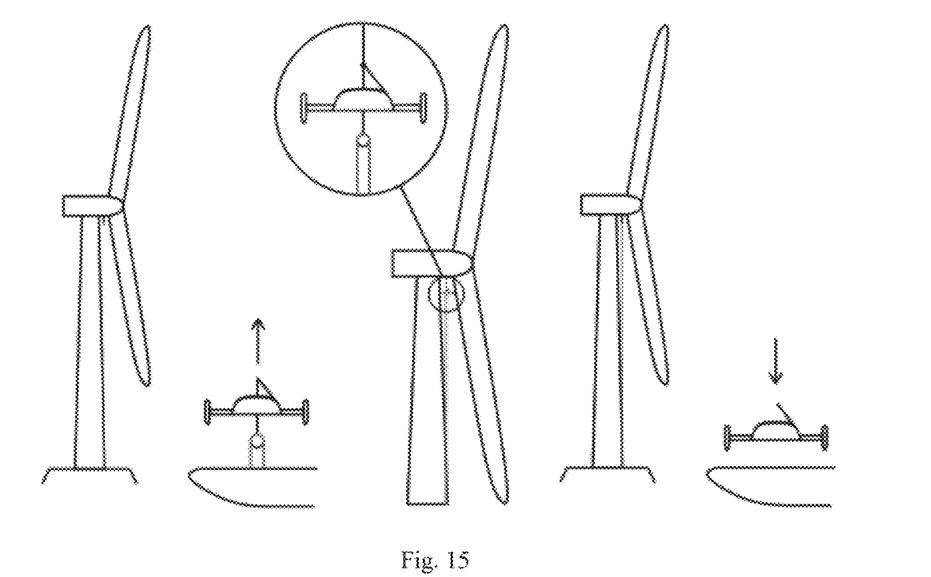
FIG. 15—an example of a drone and anchor mounting system.

FIG. 15 illustrates an example of a drone and anchor mounting system. As shown in FIG. 15, a drone may fly up from a boat or another waiting structure and may attach a pulley to an anchor in the nacelle between the tower and blades. Once successfully anchored, the drone returns to its waiting position.

Figure 16:
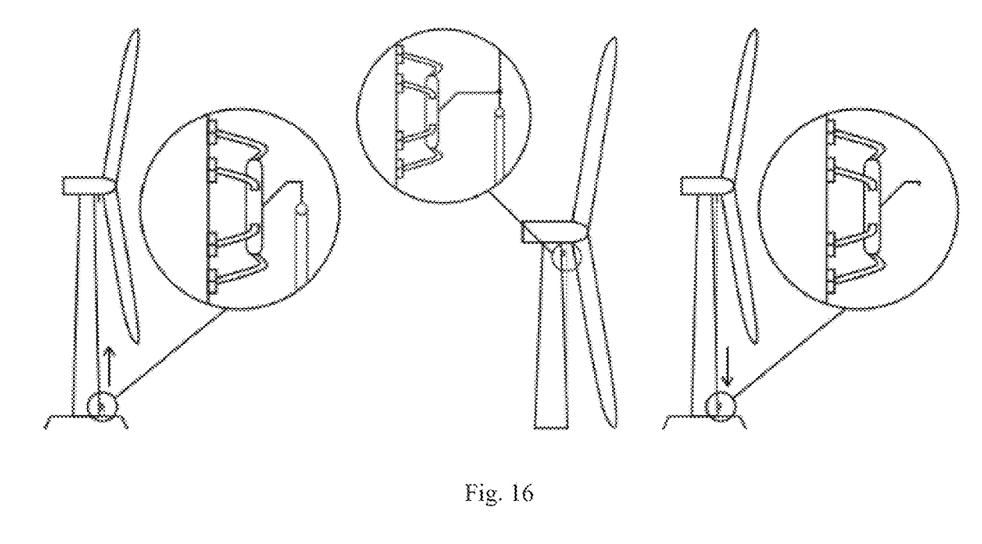
FIG. 16—an example of a magnetic crawler and anchor system.

FIG. 16 illustrates an example of a magnetic crawler and anchor system. Notably, as shown in FIG. 16, a magnetic crawler may go up the tower and attach a pulley to an anchor in the nacelle between tower and blades.

Figure 17:
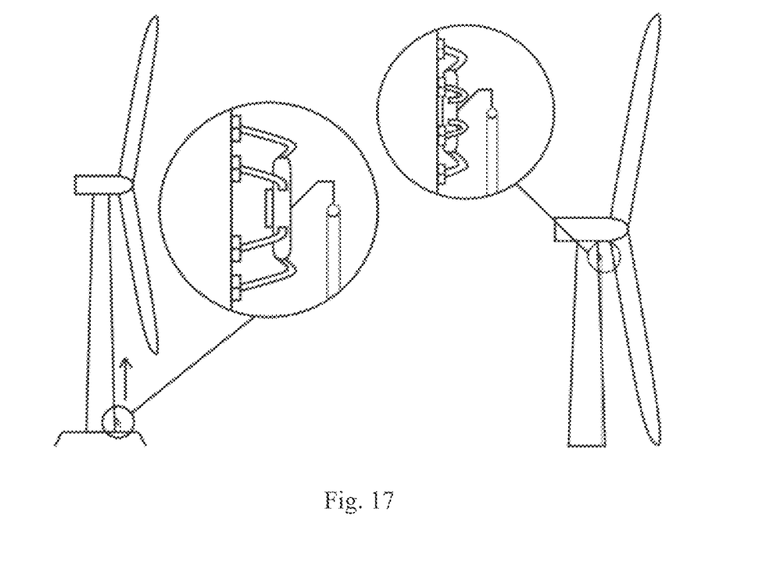
FIG. 17—an example of a magnetic crawler without an anchoring system.

FIG. 17 illustrates an example of a magnetic crawler without an anchoring system. Notably, as shown in FIG. 17, one or more magnetic crawlers may be used to lift and hold a construction in the air. In these embodiments, there is no anchor in the nacelle and special care may need to be taken in order to avoid damaging the surface of the tower.

Figure 18:
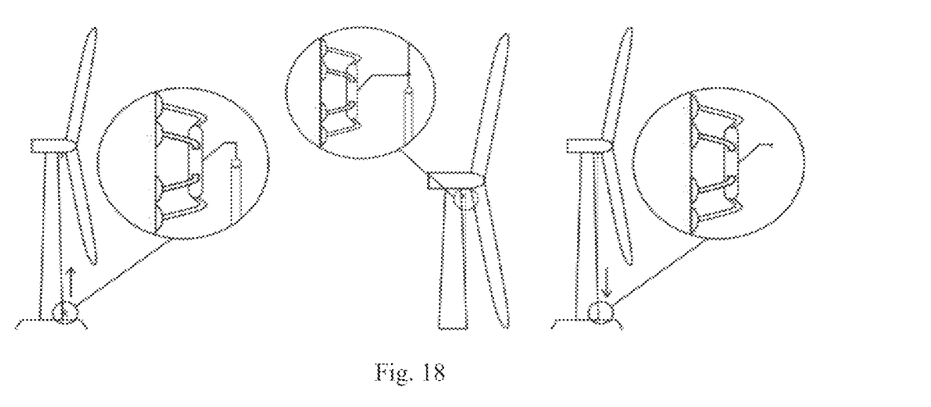
FIG. 18—an example of a vacuum crawler and anchor system.

FIG. 18 illustrates an example of a vacuum crawler and anchor system. Notably, as shown in FIG. 18, a crawler based at least in part on vacuum may go up the tower and attach a pulley to the anchor in the nacelle. This approach may work for both magnetic and wooden towers.

Figure 19:
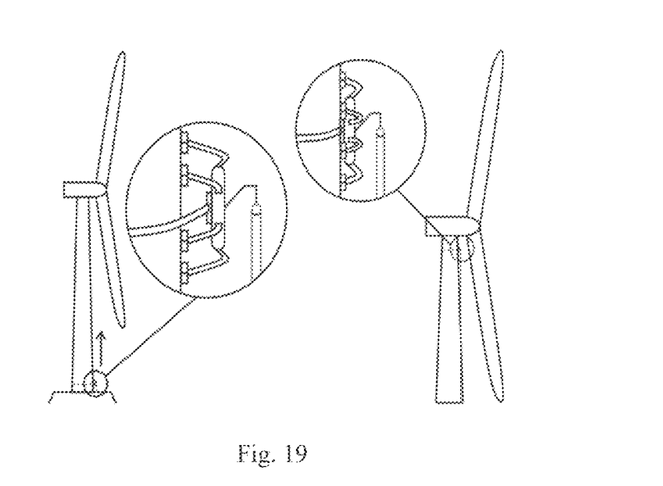
FIG. 19—an example of a crawler and belt system.

FIG. 19 illustrates an example of a crawler and belt system. Notably, a crawler may go up the tower and drag a tower belt with it. Once at the top, it may tighten the belt, which may become or provide an anchor.

Figure 20:
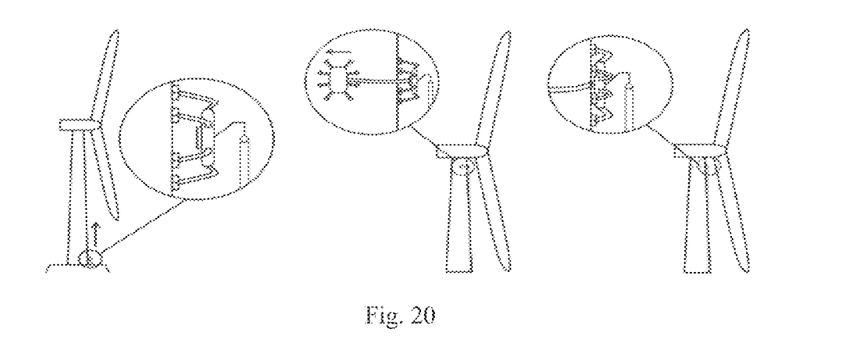
FIG. 20—an example of a two crawler and belt system.

FIG. 20 illustrates an example of a two crawler and belt system. Notably, two crawlers or a modular crawler may go up the tower. Once at the top, one of the two crawlers or a portion of the modular crawler goes around the tower pulling a belt with it. Once the belt is in place, both crawlers or both portions of the modular crawler lock together and tighten the belt forming an anchor.

Figure 21:
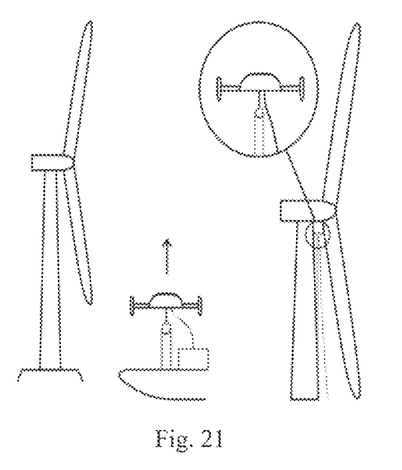
FIG. 21—an example of a tethered drone.

FIG. 21 illustrates an example of a tethered drone. The tethered drone may hover in the air, thereby providing the anchor function.

While the preceding embodiments were illustrated with particular architectures, in other embodiments there may be: fewer or additional components, positions of one or more components may be changed, two or more components may be combined, and/or a single component may be divided into two or more components. Furthermore, while the embodiments of the maintenance techniques were illustrated with particular operations, in other embodiments, there may be fewer or additional operations, the order of at least two operations may be changed, two or more operations may be combined, and/or a single operation may be divided into two or more operations.

In the preceding embodiments, some components are shown directly connected to one another, while others are shown connected via intermediate components. In each instance the method of interconnection, or 'coupling,' establishes some desired electrical communication between two or more circuit nodes, or terminals. Such coupling may often be accomplished using a number of circuit configurations, as will be understood by those of skill in the art, for example, AC coupling and/or DC coupling may be used.

In some embodiments, functionality in these circuits, components and devices is implemented in hardware and/or in software as is known in the art. For example, some or all of the functionality of these embodiments may be implemented in one or more: application-specific integrated circuit (ASICs), field-programmable gate array (FPGAs), graphics processing units (GPUs) and/or one or more digital signal processors (DSPs). Furthermore, the circuits and components may be implemented using bipolar, PMOS and/or NMOS gates or transistors, and signals in these embodiments may include digital signals that have approximately discrete values and/or analog signals that have continuous values.

Moreover, in some embodiments, at least some of the functionality of the maintenance device may be implemented using one or more integrated circuits. An output of a process for designing such an integrated circuit, or a portion of an integrated circuit, may be a non-transitory computer-readable medium such as, for example, a magnetic tape or an optical or magnetic disk. The computer-readable medium may be encoded with data structures or other information describing circuitry that may be physically instantiated as an integrated circuit or portion of an integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematic diagrams of the type detailed above and the corresponding descriptions and encode the data structures on a computer-readable medium. Those of skill in the art of integrated circuit fabrication can use such encoded data to fabricate integrated circuits comprising one or more of the circuits described herein.

The invention claimed is:

1. A wind turbine blade maintenance device, comprising:
    a base configured to be removably attached to a tower of a wind turbine and configured to displace in a vertical direction along a length of the tower;
    a telescopic arm, mechanically coupled to the base, disposed in a horizontal direction relative to the vertical direction, wherein the telescopic arm is configured to provide a selectable and dynamic displacement of a distal end of the telescopic arm relative to a vertical axis of the tower, wherein, when the maintenance device is not in use, the telescopic arm is configured to collapse along the horizontal direction and rotate towards the vertical direction and away from the horizontal direction; and
    a maintenance arm, mechanically coupled to or proximate to the distal end of the telescopic arm, wherein the maintenance arm comprises one or more sensors, one or more maintenance devices or both that are configured to perform maintenance on a given blade of the wind turbine; and
    wherein the telescopic arm comprises one or more electric turbines configured to provide a lateral force in a lateral direction, which is perpendicular to a plane defined by the vertical direction and the horizontal direction;
    the maintenance device is configured to provide a feedback loop that dynamically adjusts the lateral force provided by the one or more electric turbines based at least in part on a measurement, wherein the measurement comprises: displacement of the telescopic arm in the lateral direction; wave-induced motion; a wind speed; or a wind direction; and
    adjusting the lateral force comprises changing a magnitude of the lateral force or a direction of the lateral force.

2. The maintenance device of claim 1, wherein the base comprises wheels and one or more magnets that are configured to provide an attractive force with the tower.

3. The maintenance device of claim 1, wherein the base comprises an electric motor configured to displace the maintenance device in the vertical direction.

4. The maintenance device of claim 1, wherein the maintenance device is configured to attach to a cable anchor of a cable to or proximate to a top of the tower; and
    wherein the maintenance device comprises a winch configured to displace the maintenance device in the vertical direction.

5. The maintenance device of claim 4, wherein the cable is included in a truss.

6. The maintenance device of claim 1, wherein the maintenance device is configured to be attached to a lift device that is configured to displace the maintenance device in the vertical direction.

7. The maintenance device of claim 1, wherein, during the maintenance, the maintenance device is configured to: displace in the vertical direction; dynamically adjust the horizontal displacement; and perform the maintenance on the given blade.

8. The maintenance device of claim 1, wherein the maintenance device is configured to be fully automated.

9. The maintenance device of claim 1, wherein the maintenance device is configured to be controlled from a remote location at a different geographic location than the wind turbine.

10. The maintenance device of claim 1, wherein the telescopic arm is configured to be selectively disposed in the horizontal direction relative to the vertical direction.

11. The maintenance device of claim 1, wherein the telescopic arm is configured to provide a dynamic force in a lateral direction, which is perpendicular to a plane defined by the vertical direction and the horizontal direction, and wherein the dynamic force is based at least in part on or corresponds to one or more of: wave-induced motion, a wind speed, or a wind direction.

12. A wind turbine blade maintenance device, comprising:
    a base configured to be removably attached to a tower of a wind turbine and configured to displace in a vertical direction along a length of the tower;
    a telescopic arm, mechanically coupled to the base, disposed in a horizontal direction relative to the vertical direction, wherein the telescopic arm is configured to provide a selectable and dynamic displacement of a distal end of the telescopic arm relative to a vertical axis of the tower; and
    a maintenance arm, mechanically coupled to or proximate to the distal end of the telescopic arm, wherein the maintenance arm comprises one or more sensors, one or more maintenance devices or both that are configured to perform maintenance on a given blade of the wind turbine; and
    wherein the telescopic arm comprises one or more electric turbines configured to provide a force in a lateral direction, which is perpendicular to a plane defined by the vertical direction and the horizontal direction.

13. The maintenance device of claim 12, wherein, when the maintenance device is not in use, the telescopic arm is configured to collapse along the horizontal direction and rotate towards the vertical direction and away from the horizontal direction.

14. The maintenance device of claim 12, wherein the maintenance device is configured to provide a feedback loop that dynamically adjusts the force provided by the one or more electric turbines based at least in part on a measurement, wherein the measurement comprises: displacement of the telescopic arm in the lateral direction;

wave-induced motion; a wind speed; or a wind direction.

15. The maintenance device of claim 14, wherein adjusting the force comprises changing a magnitude of the force or a direction of the force.

16. The maintenance device of claim 12, wherein the maintenance device is configured to attach to a cable anchor of a cable to or proximate to a top of the tower; and wherein the maintenance device comprises a winch configured to displace the maintenance device in the vertical direction.

17. The maintenance device of claim 12, wherein the maintenance device is configured to be attached to a lift device that is configured to displace the maintenance device in the vertical direction.

18. The maintenance device of claim 12, wherein the maintenance device is configured to be controlled from a remote location at a different geographic location than the wind turbine.

19. The maintenance device of claim 12, wherein the telescopic arm is configured to be selectively disposed in the horizontal direction relative to the vertical direction.

20. The maintenance device of claim 12, wherein the telescopic arm is configured to provide a dynamic force in a lateral direction, which is perpendicular to a plane defined by the vertical direction and the horizontal direction, and wherein the dynamic force is based at least in part on or corresponds to one or more of: wave-induced motion, a wind speed, or a wind direction.

* * * * *